United States Patent [19]

Feng et al.

[11] Patent Number: 5,074,021

[45] Date of Patent: Dec. 24, 1991

[54] TOOL TO FACILITATE LOADING AN OPTICAL FIBER IN A CONNECTOR COMPONENT

[75] Inventors: David Q. Feng, Skokie; Igor Grois, Lincolnwood, both of Ill.

[73] Assignee: Molex Incorporated, Lisle, Ill.

[21] Appl. No.: 599,943

[22] Filed: Oct. 19, 1990

[51] Int. Cl.[5] .............................................. B25B 1/20
[52] U.S. Cl. .................................... 29/281.5; 269/903
[58] Field of Search ................. 269/903, 254 R, 287, 269/37, 152, 45; 29/281.1, 281.5, 749, 760

[56] References Cited

U.S. PATENT DOCUMENTS

| 3,881,715 | 5/1975 | Creek | 29/281.5 |
| 4,048,710 | 9/1977 | Nijman | 29/760 |
| 4,323,227 | 4/1982 | Turek | 269/903 |

OTHER PUBLICATIONS

Western Electric Technical Digest, No. 69, Jan. 1983, "Support Stand, Mounting and Cable Dressing Apparatus for a Telecommunications System," A. K. Andrews, F. S. Doyle.

Primary Examiner—Robert C. Watson
Attorney, Agent, or Firm—Louis A. Hecht; Stephen Z. Weiss; A. A. Tirva

[57] ABSTRACT

A manually manipulatable tool is disclosed to facilitate loading an optical fiber in a connector component. The tool includes a base for holding a fiber optic cable with an optical fiber projecting therefrom stripped of its jacket. A carriage holds the connector component in a position for receiving the fiber. The carriage is slidably mounted on the base whereby the carriage can be manually moved relative to the base and thereby move the connector component relative to the fiber optic cable.

10 Claims, 2 Drawing Sheets

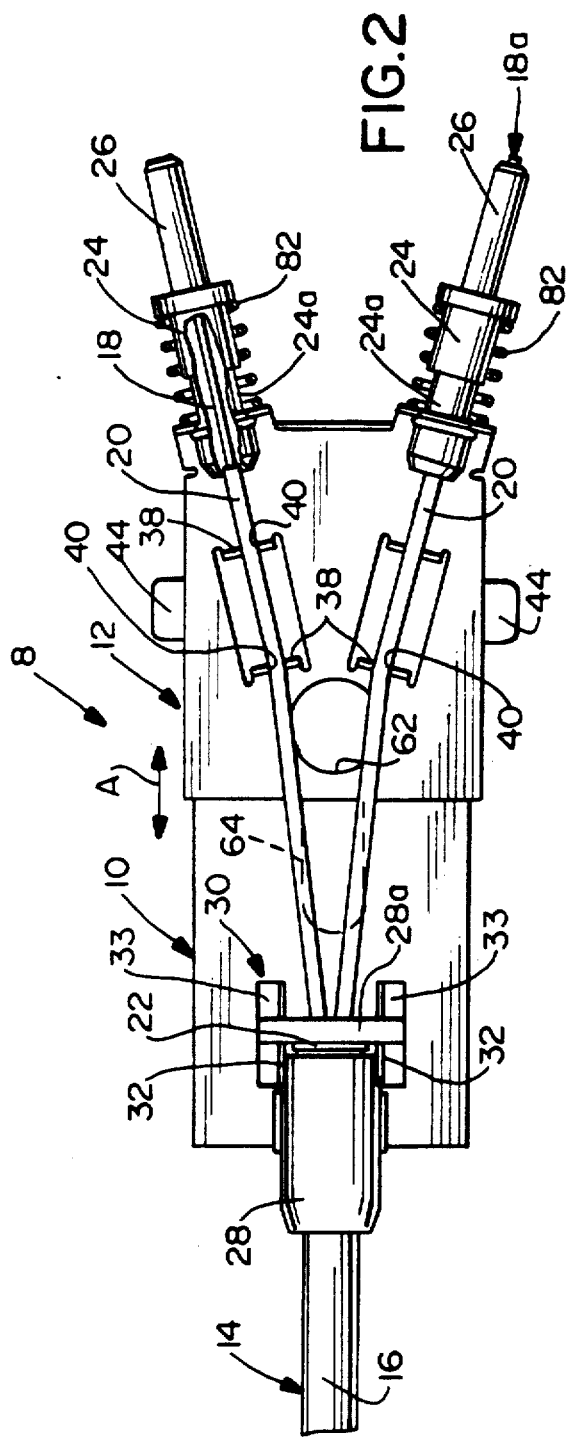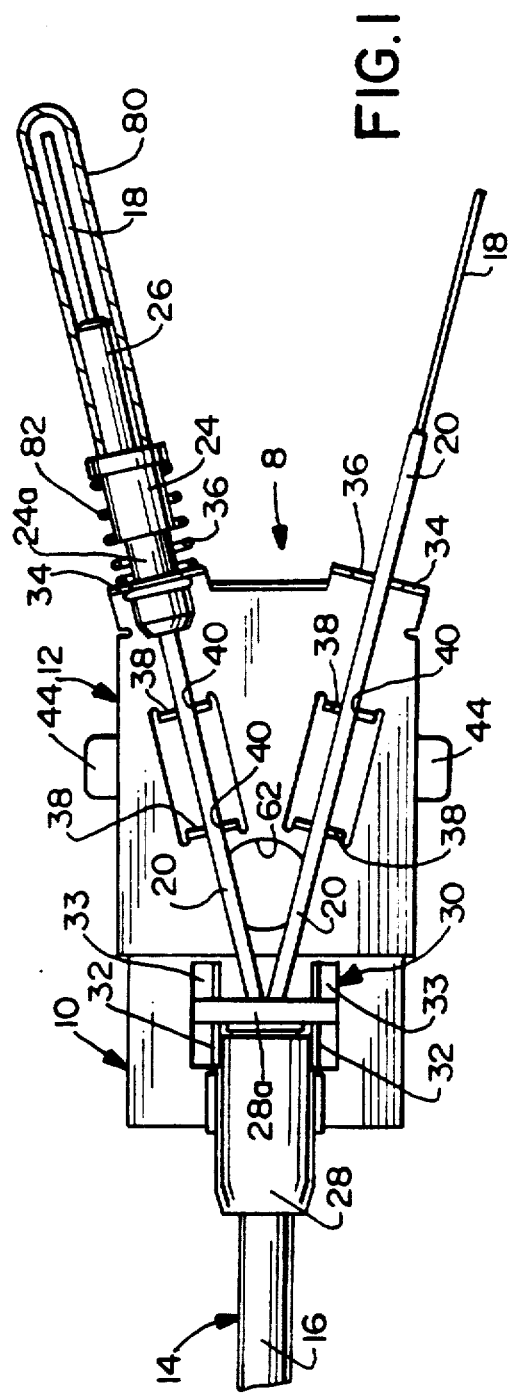

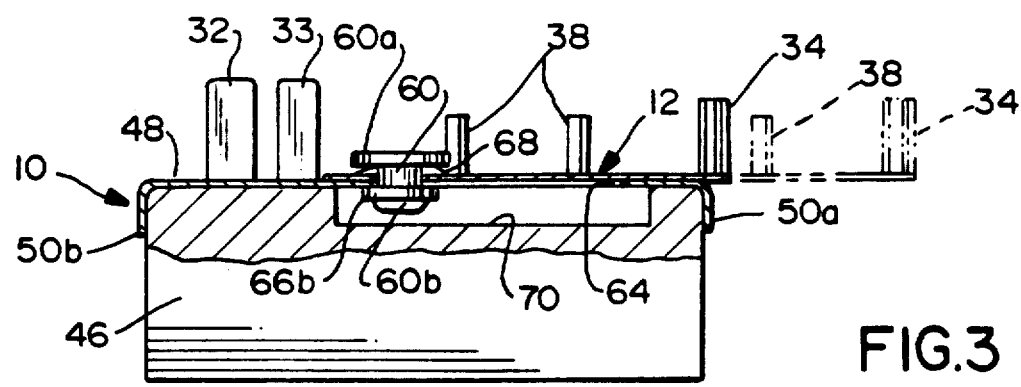
FIG.3
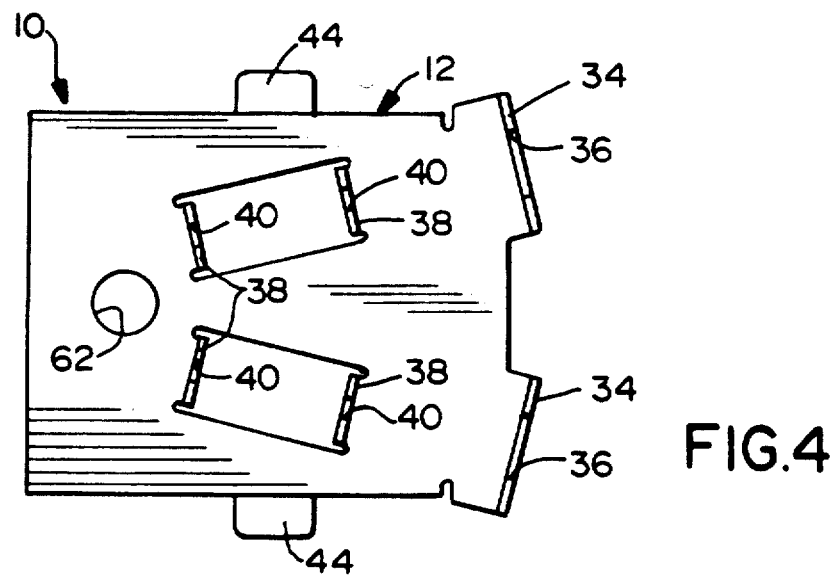
FIG.4
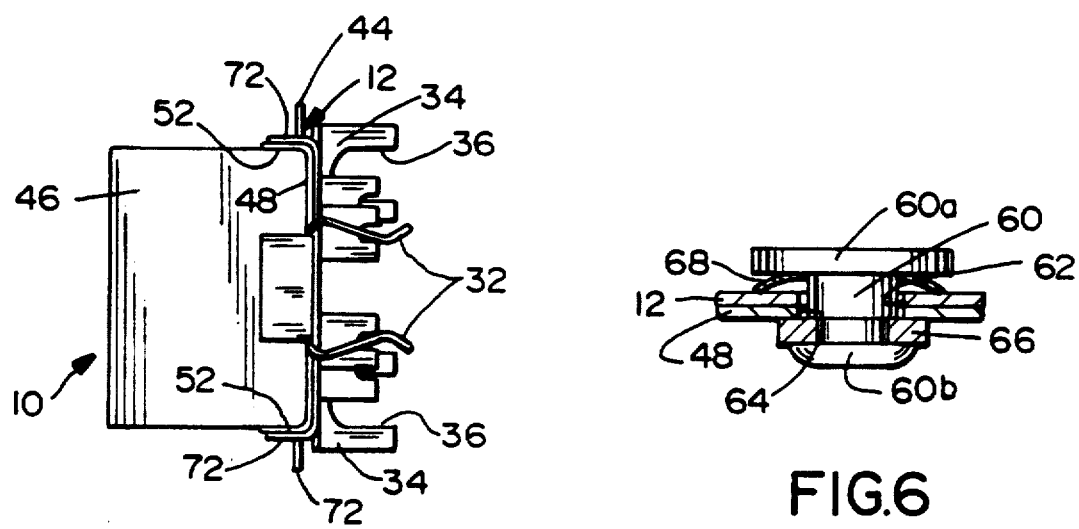
FIG.5
FIG.6

TOOL TO FACILITATE LOADING AN OPTICAL FIBER IN A CONNECTOR COMPONENT

FIELD OF THE INVENTION

This invention generally relates to the art of optical fibers and, particularly, to a manually manipulatable tool for loading an exposed optical fiber into a component of a fiber optic connector.

BACKGROUND OF THE INVENTION

Field installation, service and repair of optical fiber systems can be delicate, time consuming and often troublesome procedures because of the fragile nature of the components involved, particularly the optical fiber itself. It can be understood that field work on conventional electrical wiring systems has developed to a high degree of precision and efficiency. This is due, in no small part, to the nature of an electrical wire itself which can be bent and, in context, treated rather roughly. On the other hand, an optical fiber is a very small strand which is quite brittle and easily broken. An optical fiber cannot be bent very significantly.

A composite fiber optic cable conventionally includes an outer jacket, an inner buffer and a central or axial cladded optical fiber or fibers. The outer jacket and the inner buffer usually are fabricated of flexible, tubular plastic material. Strength members, such as elongated strands, usually are incorporated between the outer jacket and the inner buffer to protect the fiber and provide longitudinal strength for the cable while permitting easy manual manipulation of the cable itself.

However, in order to terminate the optical fiber or assemble the cable/fiber in a connector, the outer jacket and the inner buffer normally are removed to expose a length of the tiny brittle fiber. In terminating the fiber within an optical fiber connector, for instance, the connector often includes a forward ferrule, such as of ceramic material having a small center bore through which the fiber extends and barely protrudes from a distal end thereof for connection or mating with a fiber of a complementary connector. The fiber is inserted through the rear of the ferrule and often is broken whereupon further lengths of the outer jacket and inner buffer must be removed to again expose the fiber for termination. There are very few tools readily available which efficiently and accurately facilitate these termination or assembly procedures. This invention is directed to solving the above problems and providing an easily and accurately manipulatable tool for assembling an optical fiber in a connector component, such as the ferrule portion described above. In addition, the invention assumes that the assembled harness which includes the fiber optic cable and the connector components are assembled in correct positions with minimum bending and strain on the fiber that can cause dB losses.

The above problems are magnified in fiber optic connectors which are designed to terminate and mate with complementary connectors in which a plurality of optical fibers are utilized. It can be understood how difficult such procedures can become when multiple fibers are used in a single connector. Still further, and as disclosed herein, the buffered fiber and/or the fiber itself often is secured with the connector component by epoxy which greatly complicates field termination procedures and which is simplified by the invention.

SUMMARY OF THE INVENTION

An object, therefore, of the invention is to provide a new and improved manually manipulatable tool for loading an optical fiber in a connector component.

In the exemplary embodiment of the invention, the tool generally includes a base and means on the base for holding a fiber optic cable with an optical fiber projecting therefrom stripped of its buffer. A carriage is slidably mounted on the base and includes means for holding the connector component in a position receiving the optical fiber. Therefore, an operator simply positions the cable, with its exposed fiber, on the base, assembles the connector component onto the exposed fiber, and moves the carriage and the connector component relative to the fiber to perform such functions as preparing the assembly with applied epoxy for subsequent curing in an oven.

Preferably, the tool includes means on either the base or the carriage for supporting a buffered portion of the fiber between the connector component and the held portion of the fiber optic cable.

As disclosed herein, the tool is designed for loading a plurality, such as a pair, of optical fibers into a pair of connector components simultaneously as the carriage is slidably moved relative to the base to bring the electrical components into proper positions about the optical fibers.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the following description, taken in conjunction with the accompanying drawings, in which like reference numerals identify like elements in the figures and in which:

FIG. 1 is a top plan view of the tool of the invention, having a fiber optic cable in position thereon for positioning a pair of optical fibers in a pair of connector components, and with the carriage in its retracted position;

FIG. 2 is a view similar to that of FIG. 1, with the carriage slidably moved to its extended position;

FIG. 3 is a side elevational view of the tool, partially cut away to illustrate the sliding connection between the carriage and the base, and with the carriage shown in phantom in its extended position;

FIG. 4 is a top plan view of the carriage component of the tool;

FIG. 5 is a rear elevational view of the tool; and

FIG. 6 is a fragmented section through the carriage and the base, on an enlarged scale, illustrating the sliding connection therebetween.

DETAILED DESCRIPTION OF THE PREFERRED EMBODIMENT

Referring to the drawings in greater detail, and first to FIGS. 1 and 2, the invention is embodied in a manually manipulatable tool, generally designated 8, which includes a base, generally designated 10, and a carriage, generally designated 12, slidably mounted on the base for movement in the direction of double-headed arrow "A" (FIG. 2). Carriage 12 is movable relative to the base between an extended position shown in FIG. 2 and a retracted position shown in FIG. 1. Tool 8 is designed for holding a fiber optic cable, generally designated 14, which may have a single optical fiber or a plurality of optical fibers therein. A popular electrical connector of known, generally flat configuration, conventionally terminates a pair of optical fibers for mating with a pair of fibers of a complementary connector. Consequently, many fiber optic cables are provided with two fibers for these purposes, and the tool herein is designed to operate on a pair of optical fibers from a single cable 14. Of course, it should be understood that the concepts of the invention embodied in tool 8 are readily applicable for a single fiber cable as well as a cable having more than a pair of fibers.

Conventionally, a fiber optic cable, such as cable 14, includes an outer jacket 16 of insulating plastic material. One or more optical fibers 18 are encased in jacket 16 and each fiber, itself, is covered by a protective tubular buffer 20 of insulating plastic material. Some form of strength member usually is incorporated within the cable to provide longitudinal strength to the cable. For instance, a common strength system incorporates a plurality of fine fiberglass strands within outer jacket 16 and around the buffered fibers. In FIG. 2, only the very ends of the strength strands are visible, as at 22, whereby lengths of buffer 20 are exposed, along with lengths of fibers 18 being stripped of the buffer for insertion into connector components 24 which, in the optical fiber art, often are termed "contacts" synonymous with a metal contact in a conventional electrical wiring system. Connector components or contacts 24 often have a forward ferrule 26, such as of ceramic material, provided with a small central bore into which fibers 18 extend. When fully loaded, a distal end 18a (FIG. 1) of each optical fiber 18 projects slightly beyond the forward or distal end of the respective ferrule 26 for terminating or mating with fiber ends of a complementary fiber optic connector. Often, fiber optic cable 14 has a crimping ferrule 28 crimped onto outer jacket 16 near the point where the jacket and the strength members are cut to expose the buffered optical fibers.

Once fully loaded as shown in FIG. 1, the assemblage or harness defined by fiber optic cable 14, including crimping ferrule 28, and connector components 24, loaded with the optical fibers, eventually is assembled in an appropriate fiber optic connector. To facilitate the loading operation afforded by tool 8, means are provided on base 10, generally at 30, for holding fiber optic cable 14 in position. As contemplated herein, crimping ferrule 28 is considered part of the fiber optic cable and, consequently, means 30 is designed to hold and grip against the crimping ferrule. More particularly, referring to FIG. 5 in relation to FIGS. 1 and 2, a spring clip including two pairs of inwardly biased spring arms 32 and 33 are mounted on top of base 10. Crimping ferrule 28 is pressed between the spring arms and held in position on top of the base. The crimping ferrule has a flange 28a which seats between the pairs of spring arms 32 and 33.

Means are provided on carriage 12 for holding connector components 24 in positions receiving the optical fibers. More particularly, referring to FIGS. 4 and 5 in conjunction with FIGS. 1 and 2, a pair of upwardly projecting flanges 34 on carriage 12 are provided with notches or recesses 36 and into which reduced diameter portions 24a (FIG. 2) of the connector components are press fit. The reduced diameter portions are formed by flats on the sides of the components.

Means also are provided on carriage 12 for supporting buffered portions of the optical fibers between flanges 34 on the carriage which position the connector components and spring clip 32 and 33 on the base which positions the fiber optic cable. More particularly, two pairs of upwardly projecting flanges 38 are stamped out of the top of carriage 12, each flange including a notch 40 to define a saddle for receiving buffer 20 about the optical fibers. As can be seen in FIGS. 1 and 2, each pair of flanges 38 thereby provide a supporting means for a given length of the respective buffered fiber so that the fibers do not buckle when carriage 12 is slidably moved on base 10 relative to optical fiber 14. Therefore, notches 40 must be slightly larger than the diameters of buffers 20 so that the buffers can slide smoothly in the saddles provided by the notches.

Before proceeding, FIG. 4 shows that the entire carriage 12, including flanges 34 for positioning connector components 24 and flanges 38 for stabilizing the buffered fibers, is fabricated from a unitary sheet of metal with the flanges stamped and formed therefrom. In addition, a pair of laterally projecting tabs 44 are stamped from side flanges (described hereinafter) of the carriage and behind which an operator's fingers can be positioned to facilitate sliding the carriage over the base.

FIG. 3 shows that base 10 actually comprises a base block 46 with a sheet metal covering 48 on top thereof. The sheet metal covering has front and rear depending flanges 50a and 50b, respectively, overlapping the front and rear sides of base block 46. As seen in FIG. 5, the covering also has depending side flanges 52 bent over opposite sides of base block 46. Therefore, covering 48 is positioned on top of the base block and is stabilized thereon by the surrounding flanges 50a, 50b and 52. The covering may be secured to the block by appropriate adhesive. The block gives the base "body" for manually grasping by a user.

Complementary interengaging means are provided between base 10 and carriage 12 for slidably mounting the carriage on the base. More particularly, referring to FIGS. 3 and 6, a rivet 60, having a head 60a and a swaged base 60b, extends through a hole 62 (FIG. 6) in the carriage and an elongated slot 64 in covering 48 of the base. A washer 66 is sandwiched between the swaged base of the rivet and covering 48. A spring washer 68 is sandwiched between rivet head 60a and carriage 12. As seen in FIG. 3, base block 46 is provided with an elongated groove 70 for accommodating the bottom of the rivet and washer 66. Therefore, slot 64 in the base covering and groove 70 in the base block allow carriage 12 to slide back and forth over the top of the base when loading the optical fibers into the connector components. In addition, as seen in FIG. 5, sheet metal carriage 12 has side flanges 72 bent downwardly over side flanges 52 of base covering 48 to stabilize the carriage during its sliding movement.

An example of a use of the tool of the invention now will be described. To begin, a fiber optic cable, such as cable 14, is prepared by removing a given length of jacket 16 to expose a length of the optical fiber enclosed in buffer 20. Strength members 22 are separated from the fiber(s) and turned back over jacket 16. Crimping ferrule 28 is positioned over the strength members and crimped thereabout to thereby crimp the ferrule onto the cable, with the buffered fibers projecting from the end thereof. A given length of each buffer 20 then is stripped to expose a given length of each fiber 18. The length of jacket 16 and buffers 20 to be removed or stripped can be determined by using a simple template. An epoxy then is prepared and a syringe is filled with the epoxy. The needle of the syringe is inserted into connector component 24 and epoxy is injected until it appears at the top or distal end of ceramic ferrule 26. Excess epoxy is cleaned from the end face of ferrule 26, as by a paper tissue.

Tool 8 then is adjusted to its retracted condition as shown in FIG. 1. Crimping ferrule 28 is positioned on base 10 between spring arms 32, 33, with the flange 28a of the crimping ferrule positioned between the pairs of spring arms, as shown in the drawing. Buffered fibers 20 then are positioned in notches 40 which define the saddles in upwardly projecting flanges 38, with the exposed fibers 18 projecting forwardly of carriage 12. This is shown by the bottom fiber in FIG. 1.

A protection tube 80 then is positioned over ferrule 26 of connector component 24 and the connector component and protection tube are positioned over the ends of both fibers as shown by the connector component in the top of FIG. 1. The protection tubes protect the fragile optical fibers during this manual manipulation. The connector components are maintained in position in flanges 34 by coil springs 82 which, eventually, are used in the ultimate connector assembly.

Carriage 12 then is moved to its extended position as shown in FIG. 2. Protection tubes 80 are removed from ceramic ferrules 26 as shown in that figure and excess epoxy is wiped from the face of the ferrules, as with a paper tissue. The protection tubes then are replaced carriage 12 is moved back to its retracted position and the entire harness and assembly tool is placed in an oven for curing the epoxy.

After curing, the protection tubes are removed, lengths of fibers 18 projecting from the distal ends of ceramic ferrules 26 are removed by a cleaving tool and the ends of the fibers are polished whereby the harness is ready to be assembled in its appropriate fiber optic connector.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A manually manipulatable tool to facilitate loading an optical fiber in a connector component having a bore extending therethrough for slidably receiving the optical fiber, comprising:

a base;

the means on the base for holding a fiber optic cable having an outer jacket enclosing an optical fiber with the optical fiber projecting therefrom stripped of its jacket;

a carriage;

means on the carriage for holding the connector component in a position for slidably receiving the optical fiber in its bore; and complementary interengaging means between the base and the carriage for slidably mounting the carriage on the base whereby the carriage can be manually moved relative to the base and thereby move the connector component relative to the fiber optic cable and relative to the optical fiber within the bore.

2. The tool of claim 1, including means on the carriage for supporting a buffered portion of the fiber between the holding means on the base and the holding means on the carriage.

3. The tool of claim 2 wherein said supporting means is in the form of a saddle dimensioned to slidably receive the buffered portion of the fiber.

4. The tool of claim 1 wherein said holding means on the base comprises a spring clip.

5. The tool of claim 1 wherein said holding means on the base is sized to receive a crimping ferrule on the fiber optic cable.

6. The tool of claim 5 wherein said holding means on the base comprises a spring clip.

7. The tool of claim 1, including a pair of said means on the carriage for holding a pair of connector components in transverse spaced positions for receiving a pair of optical fibers from the cable.

8. The tool of claim 7 wherein said pair of holding means are structured to hold the connector components in a diverging alignment to receive the pair of optical fibers diverging from the cable.

9. The tool of claim 7, including means on one of the base and the carriage for supporting buffered portions of the pair of fibers between the holding means on the base and the pair of holding means on the carriage.

10. An assembly tool for terminating a pair of optical fibers each in a respective connector component, each component having a bore extending therethrough the tool comprising:

a base;

means on the base for holding a fiber optic cable having an outer jacket enclosing a pair of optical fibers, the optical fibers projecting from the cable stripped of the outer jacket;

a carriage slidably mounted on the base;

a pair of holding means on the carriage, each means for holding one of the connector components in transverse spaced positions for slidably receiving an optical fiber in its bore, and means for moving the carriage to position the connector components in a first or second predetermined location relative to the fiber optic cable.

* * * * *